United States Patent

[11] 3,632,985

[72] Inventors Duward J. Bare
  Riverdale;
  Chester S. Penk, Crestwood, both of Ill.
[21] Appl. No. 17,427
[22] Filed Mar. 9, 1970
[45] Patented Jan. 4, 1972
[73] Assignee Blue M Electric Company
  Blue Island, Ill.

[54] THERMOCOUPLE BRIDGE TEMPERATURE CONTROL
  12 Claims, 1 Drawing Fig.
[52] U.S. Cl.................................................. 219/499
[51] Int. Cl..................................................... H05b 1/02
[50] Field of Search........................................ 219/413,
  497, 499, 506, 501

[56] References Cited
  UNITED STATES PATENTS
3,256,734 6/1966 Storke........................ 219/497

3,371,231 2/1968 Burley........................ 219/501 X
  FOREIGN PATENTS
897,928 5/1962 Great Britain............... 219/497

Primary Examiner—Bernard A. Gilheany
Assistant Examiner—F. E. Bell
Attorney—Leonard G. Nierman ABSTRACT: A linearly calibrated temperature control suitable for economical commercial manufacture employs a thermocouple as an element of an arm of a Wheatstone bridge of particular resistance relation having a high-gain operational amplifier as the DC unbalance detector. The control temperature is varied by manual variation of resistance of a bridge arm and variations of amplifier offset are compensated at all temperatures by single-temperature scale adjustment. The DC output of the operational amplifier controls a power regulation circuit which responds to unbalance of one polarity.

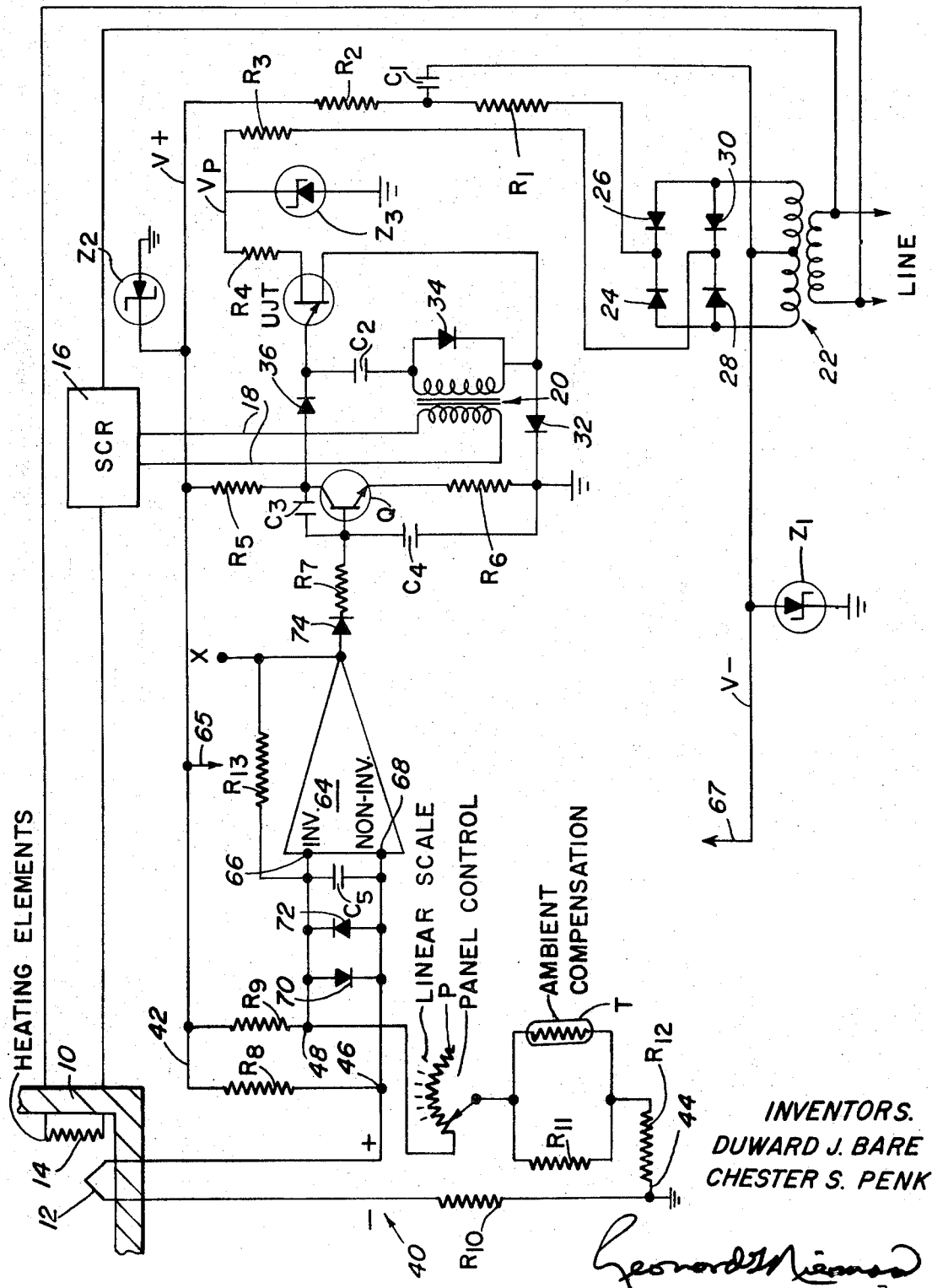

THERMOCOUPLE BRIDGE TEMPERATURE CONTROL

This invention relates to automatic temperature controls, and particularly to temperature controls of the type wherein input heating power to an oven or similar unit is proportionally regulated to maintain a manually preset temperature by a thermocouple employed as the temperature-sensing element.

In U.S. Pat. No. 3,392,268 of the same inventors, there is described a simple and inexpensive construction of proportional heat-input control for a selectable-temperature oven, employing a thermistor for temperature sensing. The system of the present invention is for the same general purposes as there described, but employs the highly precise temperature-regulation capability of a thermocouple, without the cost and complexity heretofore associated with such precision, and permits a wide range of accurate temperature selection with linear calibration set for the entire range by setting at a single temperature.

Numerous advantages of thermocouples for temperature measurement and control, as compared with thermistors and similar sensors, are of course well known, particularly as regards long term constancy and reliability of transducer action even where less precise sensors are subject to drifts and aging effects with the repeated temperature cycles produced in the normal operation of laboratory ovens and similar installations. However, the thermocouple automatic control systems of the prior art have either been too costly or otherwise impractical for widespread use in commercially manufactured laboratory ovens and similar equipment.

It is accordingly a principal object of the present invention to provide a simple and inexpensive, but nevertheless reliably calibrated and convenient and accurate, thermocouple temperature control system for incorporation in laboratory ovens and similar equipment. This object is achieved by employing in a feedback-type automatic control system a novel form of thermocouple bridge whose unbalance signal is fed to a high-gain operational amplifier. By reason of the specific relation between the resistances of the bridge arms, together with the linearity of a thermocouple as a temperature transducer, the temperature scale is linear. Input-output offset variations in individual operational amplifiers employed in production line assembly are simply correctable by a single-temperature calibration. This and further features of the invention will best be understood from the embodiment illustrated in the drawing.

Understanding of the invention will be facilitated by first describing the portions of the system which are similar to those of the prior art. As schematically illustrated at 10, the oven contains a thermocouple 12, which is employed to control the temperature, and heating elements 14, the input to which is varied by a silicon-controlled rectifier (SCR) circuit 16, connected in series with the heating elements 14 across the power line. The SCR circuit 16 is shown merely in block form in the drawing, being the same as in U.S. Pat. NO. 3,392,268. To avoid unnecessary detail in illustration, there is shown only a single control input 18 thereto, fed by a single secondary winding of a transformer 20, but it will be understood that the transformer 20 has two secondaries respectively controlling the duration of the ontime of the heating elements in alternate half-cycles of the alternating line.

Power for the measurement and control system is derived from the secondary of a power transformer 22, to which two full-wave rectifier circuits are connected. The first consists of rectifiers 24 and 26 connected to opposite terminals in a polarity to conduct only when each is positive, the junction of the rectifiers being connected to a series filter resistor $R_1$ having a filter output capacitor $C_1$ returned to the transformer center-tap, which is grounded through a Zener diode $Z_1$; the latter is polarized to maintain the potential of the tap negative with respect to ground to form a negative supply V−. The output of the filter $R_1 C_1$ is fed through a dropping resistor $R_2$ to form a positive supply V+ regulated by a Zener diode $Z_2$ acting with diode $Z_1$ to provide balanced oppositely polarized regulated supplies.

The second full-wave rectifier system, consisting of rectifiers 28 and 30, is provided with no filter, but has a dropping resistor $R_3$ which acts with a grounded Zener diode $Z_3$ to convert the half-cycle positive sine loops to broad flat-topped positive pulses, the pulsating voltage supply being indicated as $V_P$ and constituting the interbase supply connected to the base-two resistor $R_4$ of a unijunction transistor UJT, base-one of which is grounded through a diode 32.

The emitter of the unijunction UJT is connected to a charging capacitor $C_2$ which is returned to base-one through the primary of the transformer 20, the latter being shunted by a diode 34. The capacitor $C_2$ is coupled to the collector of an NPN-transistor Q through a diode 36 and charges through the collector resistor $R_5$ at a rate controlled by the collector current. Transistor Q has a collector resistor $R_5$, an emitter resistor $R_6$ and a base resistor $R_7$. The collector is bypassed to the base for alternating current by a capacitor $C_3$ and the base is similarly bypassed to ground by a capacitor $C_4$.

With certain exceptions to be noted, the operation of the portion of the circuit thus far described is analogous to the corresponding portion of the system of the earlier patent of the same inventors. For any given positive DC input at the base of transistor Q, the capacitor $C_2$ charges at a rate sufficient to fire the unijunction UJT at a fixed point in each half-cycle of the line voltage, thus in turn firing the SCR circuit 16. An increase in base input current to the NPN-transistor produced by an increase in thermocouple temperature as later described, reduces the charging current and thus turns on UJT at a later point in the cycle, reducing the power input to the heating elements 14. Conversely, of course, a decrease in base current input (thermocouple output) increases the charging rate of capacitor $C_2$, increasing the power input to the heating elements by advancing the firing of the SCR circuit.

The use of the dual power supply, providing filtered DC for the operation of transistor Q and unfiltered or pulsed DC for operation of the unijunction, is found to eliminate a shift of unijunction turn-on point which reduces the correction of large line-voltage changes where pulsed DC is used as the collector supply of Q. The clipping of the sine loops by $R_3$ and $C_3$ is of course effective so early in each half-cycle that the alteration of waveform slope of the interbase voltage at the beginning and end of each pulsation which is produced by a large change in line voltage produces no effect on the timing action. However, where a pulsating source is also used for the previous stage, it will be seen upon study that there is a shift in the turn-on point of the unijunction with large line variation which is in the direction to increase the temperature change caused directly by the change in power supplied to the heating elements; a line voltage increase slightly advances the initial portion of the capacitor charging cycle, and a line voltage decrease slightly retards it, thus adding to the temperature change produced by any given line voltage change which must be corrected. This source of slightly reduced accuracy in compensating for line voltage change is eliminated by employment of the regulated DC supply V+. At least equally importantly, the commencement of charging of the capacitor immediately upon extinction of the unijunction discharge extends the upper limit of power input to the heating elements.

The diodes 32, 34 and 36 cooperate to form, in essence, separate charging and discharging circuits for the capacitor $C_2$, and thus minimize drifts and jitter in the firing point of the SCR circuit and also permit sufficiently fast charging to provide early firing without making the selection of other components, particularly the transformer 20, highly critical. The capacitor discharge occurs only through the series circuit of the capacitor, the transformer primary, and the unijunction of the transistor UJT, the balance of the circuit being isolated, and the shunt diode suppressing "ringing" of the transformer. The charging current, however, bypasses the inductance and resistance of the transformer primary. The appearance at the base of the transistor Q of line frequency transient pickup, etc., can affect operation adversely and such currents are accordingly bypassed by the capacitors $C_3$ and $C_4$. In addition to the improvement in these respects, the diodes and capacitors minimize interaction between the control systems for individual phases of a multiphase line, as later mentioned.

It has already been observed that the overall operation of this power control circuit as regards correction of deviations from preset temperature is otherwise similar to that of the corresponding portion of the system of the earlier patent. However, the employment of transistor Q shunting the charging capacitor, rather than in series therewith, to control its charging rate, when combined with the input system which is the more basic aspect of the invention now to be described, produces a substantially different and advantageous mode of operation in startup, as later discussed.

The thermocouple 12 is located in one arm of a bridge 40. The bridge is in the form of a Wheatstone bridge, having one pair of opposite terminals 42 and 44 connected across the V+ supply, and thus serving as input or energizing terminals, and another pair of opposite terminals 46 and 48 serving as output or unbalance-detection terminals, The upper arms connected to the positive supply at 42 and to terminals 46 and 48, respectively, are fixed resistances $R_8$ and $R_9$. A further fixed resistance $R_{10}$ is in series with the thermocouple in the lower arm between the terminals or junctions 46 and 44. In the lower arm between the terminals or junctions 48 and 44 is a series combination of a panel-mounted potentiometer P, fixed resistances $R_{11}$ and $R_{12}$ in series therewith, and thermistor T in parallel with the resistor $R_{11}$.

An integrated-circuit operational amplifier 64 has its input connected between the output terminals 46 and 48 of the bridge, the inverting input 66 being connected to the latter and the noninverting input 68 being connected to the former. Oppositely polarized diodes 70 and 72, and a capacitor $C_5$, are shunted across the input terminals; as later seen, large-signal unbalance of the bridge can exist only as a transient in startup, shutdown, or reaching of a new temperature setting, and the entire operating range of inputs is in the small threshold range of the diodes, which prevent transient overloading of the amplifier. The output of the operational amplifier is connected to the inverting input by a negative feedback stabilizing resistor $R_{13}$, of sufficiently high value to produce very high gain.

Operating potentials for the operational amplifier 64 are provided by the balanced-to-ground positive supply V+ and negative supply V−, the details of connection of these to the operational amplifier being indicated in the drawings only by suitable arrows 65 and 67 from the respective supplies.

The resistors $R_8$ and $R_9$ are of much higher resistance than the resistances in the corresponding lower arms of the bridge, the resistance of each of the upper arms of the bridge being a large multiple, preferably more than 100, of the resistance of the lower arm connected thereto at 46 or 48. The gain-determining resistor $R_{13}$ is of a still greater value. The use of fixed resistances for the high resistance bridge arms is found to be desirable for proper operation because of the sensitivity of the bridge to errors or drifts caused by resistance change at the movable tap of a potentiometer.

The thermocouple 12 is connnected in the circuit in a polarity opposing the current produced by the positive supply to the bridge, and no current is drawn from the thermocouple, the current flow therethrough being reverse, rather than forward, slightly altering the normal thermocouple calibration by thermoelectric cooling. The equivalent circuit of the arm 44–46 of the bridge is of course the internal resistance of the thermocouple 12 and its leads in series with the resistor $R_{10}$, and in series with the thermoelectric potential.

The design values and operation of the bridge are most easily analyzed by applying the principle of superposition of the currents produced by the two potential sources present, the bridge supply V+ and the thermocouple potential. Closely controlled equilibrium is obtained at any given temperature preset on the panel control P, which is desirably calibrated empirically for full accuracy, although the approximate calibration may be computed for any given resistance value of the potentiometer P by considering the bridge as balanced at the corresponding thermocouple hot junction temperatures.

The large ratio of the resistances $R_8$ and $R_9$ to the resistances in the two lower arms assures that all of the error-signal appears between the detection terminals, i.e., that the effective current (actually a reduction of thermocouple reverse current) from the thermocouple does not result in the loss of a substantial portion of the error signal which would result if the upper bridge arms were of the same order of magnitude of resistance as the lower.

If the ratio of the resistance between 46 and 44 to the resistance between 42 and 46 is identical with the ratio of the resistance between 48 and 44, with potentiometer P at zero, to the resistance between 42 and 48, the bridge is in balance whenever the thermocouple potential is equal to the drop across the potentiometer P. With the current through the latter essentially independent of its setting because of the large value of $R_9$, setting of the bridge balance condition is a matter of proportionality of the resistance of potentiometer P to the thermocouple potential. Since the latter is essentially linear with temperature, the temperature calibration of the scale for balance of the bridge is essentially linear, and this fact is important to the maximum practicality of the use of an operational amplifier, as later seen.

The nature of the closed-loop feedback system by which temperature stabilization is achieved (the overall output represented by heater power being fed back to the input in the form of sensed temperature) is such as to produce equilibrium circuit conditions characterized by small residual unbalance signal which differs for each set temperature. In principle, the illustrated bridge may be employed over a temperature range which includes a control temperature (neglecting the changes in line voltage heating load, etc., which are the subject of the feedback correction) at which the bridge is in full balance, and in which an error signal producing corrective action will be of one polarity or the other. However, there can exist only one such point, and higher and lower temperatures within the control range are in such case identified with equilibrium unbalance signals of opposite polarity and of magnitude growing with departure from the point of null equilibrium. Such use of the bridge might appear to be advantageous from the standpoint of control sensitivity, when it is considered that a bridge is usually designed for operation as closely as possible to its null condition. However, it will be seen upon study of the present structure that since any change in thermocouple potential appears virtually unimpaired at the unbalance detector input, there is no substantial sensitivity loss in excluding the null condition from the operating range. Both simplification of the circuitry and substantial performance advantage are obtained by having the null point of the bridge representing an operating or control condition slightly above the upper limit or the range of temperatures for which the system is designed, so that all preset temperatures, the equilibrium residual error signal is of the same polarity and of a magnitude decreasing with the preset temperature, the polarity of the equilibrium error signal being the polarity representative of excess thermocouple potential as compared with balancing potential. With maximum power applied to the heating elements when the bridge unbalance is of the opposite polarity, the preset temperature is rapidly reached in startup, since full power remains applied as the oven is heated to the point of exact bridge balance, at which point reduction of the input power commences, thus making unnecessary further provision for rapid startup as well as provision for "anticipation" of the reaching of the preset temperature.

The calibration of the temperature dial based on the assumption of wholly balanced condition at each temperature, earlier discussed, would accordingly not be theoretically accurate. The magnitude of the departure is maximum at the lower end of the temperature scale, corresponding to the largest usable values of the residual unbalance signal, i.e., conduction of transistor Q so that the discharge of the unijunction occurs very close to the end of each half-cycle. Because of the high gain of the amplifier, the departure from theoretical full balance calibration even at this point is relatively small.

Although nonlinearity of the relation between residual bridge unbalance and maintained temperature may be made small by experimental design of the power control portion of the circuit if so desired, this is not generally of importance; any error of calibration introduced by wholly linear division of the scale between upper and lower temperature values is negligible in most uses.

Compensation for ambient temperature change, important because of the location of the circuit, including the cold thermocouple junction, closely adjacent to the oven, is made by the parallel combination of fixed resistance $R_{11}$ and thermistor T in series with the control potentiometer P, the value of the thermistor T for any given temperature coefficient being correlated with the value of the resistance R, so that there is compensation both for variations in the temperature of the cold junction of the thermocouple and for any ambient temperature effects on the control circuit itself. The proper compensation may be first approximated for both high and low control points, i.e., values of potentiometer resistance, by calculating the required resistance change to produce the same change in potential at 48 by thermistor action as is produced at 46 by change in the cold junction temperature. The approximate values of $R_{11}$ and T thus derived may then be used as the starting point for simple experimental determination of satisfactory approximation to exact compensation of an overall prototype system over the entire range of control temperatures and expected conditions of operation.

The illustrated unit is a control for heating elements 10 shown as fed by control system from the single-phase power line. Where, as is common, there are heating elements fed by a three-phase power line, the output from the operational amplifier 64 is fed in parallel to three power control systems, the output for the two added phases being shown at X in the drawing. The circuits (not shown) for the other two phases are essentially duplicative of the circuits of Q and UJT, each of course also having an independent SCR circuit 16. For conservation of components, the DC potential of V+ is employed directly in the other two phases, without duplication of this portion of the supply. However, a pulsating supply for the operation of the unijunction portion of the circuit is provided separately in each case, to provide the necessary synchronization of the pulsating supply with the alternating heater power which is controlled. The output to each of the parallel-connected power control system from the amplifier 64 is provided with a diode 74 to prevent backfeeding of firing transients which might otherwise cause interaction between the control systems for the respective phases, the advantage of certain of the other features of construction in this respect having been earlier mentioned.

A construction of the illustrated system which has been found to provide excellent control over a wide range of preset calibrated temperatures, with essentially negligible effects produced by a wide range of operating conditions, in use with an iron-constantan couple of 5 ohms resistance, employs the following components:

Resistors (composition resistors, ½-watt dissipation, 10% tolerance where not stated):

| | |
|---|---|
| $R_1$ | 500 ohm, 5w., wirewound. |
| $R_2$ | 5k, 10w., wirewound. |
| $R_3$ | 4k, 10w., wirewound. |
| $R_4$ | 330 ohm, ½w., 5%. |
| $R_5$ | 4.7k, ½w., 5%. |
| $R_6$ | 1k, ½w., 5%. |
| $R_7$ | 3.9k, ½w., 5%. |
| $R_8$ | 22.1k, 1%, metal film. |
| $R_9$ | 80.6k, 1%, metal film. |
| $R_{10}$ | 56.2 ohm, 1%, metal film. |
| $R_{11}$ | 30 ohm, ½w., 5%. |
| $R_{12}$ | 187 ohm, 1%, metal film. |
| $R_{13}$ | 1 meg., 1%, metal film. |
| T | 50 ohms at 25° C, Fenwal LB 15J1. |
| P | 200 ohm, wirewound, 10-turn. |

Capacitors:

| | |
|---|---|
| $C_1$ | 170 mf., 200 V, electrolytic. |
| $C_2$ | 0.1 mf. 100 V, 10%. |
| $C_3$ | 0.05 mf, 500 V, ceramic. |
| $C_4$ | 0.001 mf. 1,000 V, ceramic. |
| $C_5$ | 100 mf, 3 V. |

Zener diodes: 18 V, 1 watt, 5%.
Other diodes: 1 amp, 400 V, inverse.
Transformers:
20 twin secondary pulse transformer.
22 primary 240 V, secondary 140-0-140 V.
Transistors:
Q Motorola 2N3903.
UJT G.E. 2N2646.
Operational Amplifier: Motorola MC1533G (gain and offset pins 7 and 8 connected to V+, lag pins 3 and 10 each connected to output pin 5 by 0.1 mf capacitor).

The invention is of particular advantage for economical production-line construction with a minimum of requirement for adjustment and calibration, despite the substantial tolerances of uniformity of individual transistors and integrated circuit operational amplifiers which are associated with low component cost. The effects of variation of static characteristics of individual transistors Q are made very small by the negative feedback provided by the emitter resistor. The effects of variations of characteristics of successive specimens of the unijunction transistor UJT are also inconsequential, even the charging capacitor $C_2$ and the resistor $R_5$ through which it charges being of low precision requirement. The gain of the operational amplifier is controlled by the ratio of the resistance value of the negative feedback resistor to the effective output resistance of the bridge, and is accordingly independent of the variations in open-loop gain which are typical of inexpensive integrated circuit operational amplifiers. The primary variable affecting uniformity of calibration of units successively assembled is the variation in input-output offset of such amplifiers. The effect of such variation is fairly major, since the offset variation tolerances in such amplifiers represent an appreciable fraction of the total range of equilibrium input unbalance signals from the bridge. It is of course possible to provide added external electrical components for matching output null to input null at the terminal (not illustrated) provided for this purpose in many general purpose commercial integrated circuit operational amplifiers. However, this is made unnecessary by the present circuit, compensation for this variation in production line end products being more simply accomplished by using a potentiometer P of a resistance value exceeding the nominal correspondence with the temperature range covered by the calibrated indicator associated with the potentiometer, and shifting the relation between the potentiometer shaft or other manual control and the temperature scale in a single-point calibration operation at a median temperature. This simple adjustment is enabled by the substantial linearity of the relation between potentiometer resistance and calibrated temperature provided by the employment of the constant-current resistance relation for the adjustable balancing potential.

Persons skilled in the art will readily observe that the more basic aspects of the invention may be employed in manners substantially differing from the specific embodiment illustrated and described. As an obvious example, control for the heat transfer here represented by the heating elements of an oven may, with appropriate alteration, be provided for a proportioning heat removal element of a refrigerating system, and particular electronic circuits may readily be designed which appear substantially different but nevertheless incorporate the present teachings. Accordingly, the scope of the protection afforded the invention should be determined solely in accordance with the definitions thereof in the appended claims.

What is claimed is:

1. In a temperature control comprising a temperature-responsive voltage source including a thermocouple, a manually variable source of balancing potential, means for comparing the temperature-responsive source and the balancing source, and means for producing heat transfer at a rate responsive to the magnitude of the difference to establish and maintain manually selected temperatures, the improved construction characterized by:

a. the comparing means comprising a high-gain operational amplifier, b. and the source of balancing potential having a control member varying the potential linearly with movement thereof and having a visual indicator essentially linearly calibrated in temperature, the control member varying the balancing potential over a range greater than the range of balancing potentials corresponding to the calibrated temperature range, so that substantially uniform temperature calibration may be obtained in commercial manufacture, despite variation in input-output offset of individual operational amplifiers, by single-temperature positioning of the indicator relative to the control member.

2. The temperature control of claim 1 further characterized by:

c. said sources and comparing means comprising a temperature-sensitive resistive Wheatstone bridge having first and second series-connected arms and third and fourth series-connected arms connected in parallel with the first and second arms across a DC energizing source, and having the operational amplifier input connected between the junctions of the respective pairs of arms, d. the first and third arms each being of resistance which is a large multiple of that of the second and fourth, respectively, e. the thermocouple being in one of said arms of lower resistance and in polarity opposing the energizing source, f. and the control member being a variable resistor in one of said arms of lower resistance.

3. The temperature control of claim 2 further characterized by:

g. the control member and the thermocouple being in opposite low-resistance arms.

4. The temperature control of claim 3 further characterized by:

h. at least one parallel combination of a resistor and thermistor in series with the control member for ambient temperature compensation.

5. The temperature control of claim 1 wherein the source of balancing potential includes at least one parallel combination of a thermistor and a resistor, to compensate for variation in the temperature of the cold junction of the thermocouple.

6. The temperature control of claim 1 further characterized by:

c. the heat-transfer-producing means comprising regulating means coupled to the amplifier output and maintaining a maximum heat transfer rate at substantially all input values of polarity indicative of requirement for greater heat transfer, and decreasing the heat transfer rate with increasing input of the opposite polarity, so that reduction heat transfer commences in start-up only when the preselected temperature is closely approached, whereupon the heat transfer is reduced until the equilibrium temperature is reached.

7. The temperature control of claim 6 having the output of the amplifier substantially null at null input and connected to the current-control input of a transistor rendered substantially conducting only by input of said opposite polarity.

8. The temperature control of claim 7 wherein the transistor is connected across a charging capacitor to control the rate of charging thereof, and including means to discharge the capacitor and initiate heat-transfer energization upon reaching a predetermined potential in each half-cycle of an alternating heat-transfer power source.

9. The temperature control of claim 8 wherein the discharging means comprises a direct voltage supply pulsating in synchronism with the power source and the charging potential for the capacitor comprises filtered direct voltage.

10. The temperature control of claim 8 having a transformer primary in series with the capacitor and having a rectifier bypassing the transformer primary only for current of charging polarity.

11. The temperature control of claim 10 wherein said power source is one phase of a three-phase line, and having means for connecting the amplifier output to power-control circuits for the other phases, and a rectifier connected between the amplifier output and the transistor input blocking output current of polarity indicative of need for greater heat transfer.

12. The temperature control of claim 8 having at least one rectifier blocking reverse current through the charging circuit of the capacitor.

* * * * *

PO-1050
(5/69)

UNITED STATES PATENT OFFICE
CERTIFICATE OF CORRECTION

Patent No. 3,632,985          Dated January 4, 1972

Inventor(s) Duward J. Bare and Chester S. Penk

It is certified that error appears in the above-identified patent and that said Letters Patent are hereby corrected as shown below:

Column 5, line 29, "control system from the" should be --a--.

Column 5, line 45, "system" should be --systems--.

Column 5, line 57 "1/2 watt" should be --1/4 watt--.

Signed and sealed this 18th day of July 1972.

(SEAL)
Attest:

EDWARD M. FLETCHER, JR.　　　　ROBERT GOTTSCHALK
Attesting Officer　　　　　　　　Commissioner of Patents